April 9, 1940.  J. C. L. THORNHILL ET AL  2,196,280
SCOOP SCALE
Filed Oct. 22, 1938

J. C. Lee Thornhill
Fred McCracken
INVENTORS

BY Frank Zugelter
ATTORNEY

Patented Apr. 9, 1940

2,196,280

UNITED STATES PATENT OFFICE 2,196,280

SCOOP SCALE

J. C. Lee Thornhill, Uniontown, Ala., and Fred McCracken, Cincinnati, Ohio, said McCracken assignor to said Thornhill Application October 22, 1938, Serial No. 236,422

1 Claim. (Cl. 265—66)

The present invention relates to a scoop scale, or a scoop structure having a weighing means incorporated therein.

An object of the invention is to provide a device of the character stated, which includes a novel arrangement of elements whereby accuracy of the weighing means is assured, in practical usage.

Another object is to provide a scoop scale structure of simplified construction, and one which may be manufactured at a minimum cost while at the same time preserving the accuracy thereof.

Another object is to provide a scoop scale of pleasing design and proportions, and which is so constructed as to facilitate reading of the scale or weight indicator thereof.

A further object is to provide durable and effective mechanism, in a scoop scale, which will give uninterrupted long-lived and trouble-free service.

The foregoing and other objects are attained by the means described herein and disclosed in the accompanying drawing, in which.

Figure 1:
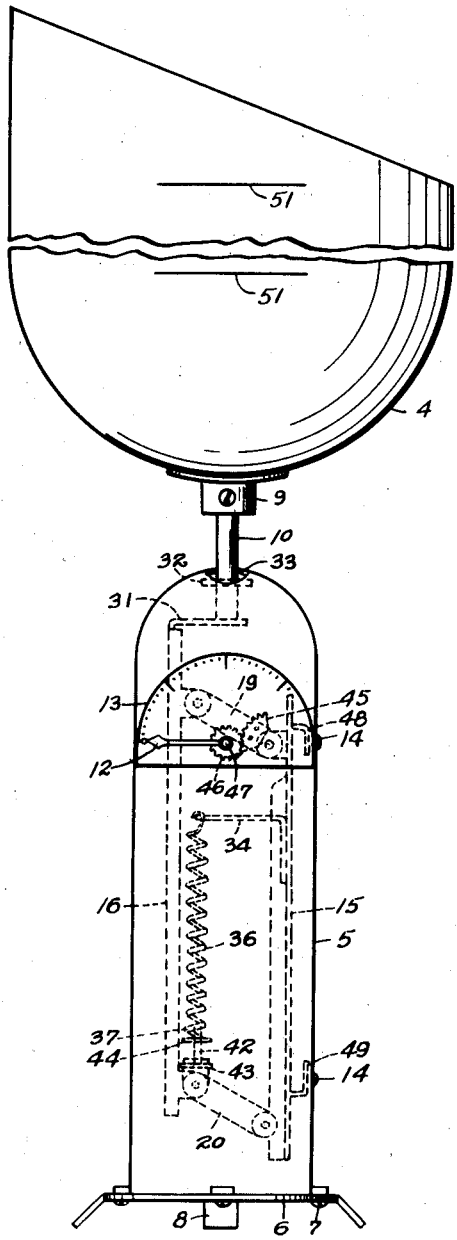
Fig. 1 is an elevational view of the device of the invention, part being broken away.

With reference to the accompanying drawing, 4 indicates a scoop or other container, and 5 indicates the handle thereof. The handle of the device has a free lower end provided with a base of any suitable character, whereby the scoop scale of the invention may be placed on end in an upright position. By way of example, the base may comprise a plate 6 screwed or otherwise secured to the handle 5 as at 7. If desired, the base may be provided with suitable legs or supporting means 8. The number of legs employed may be three or more.

By employing a suitable coupling means 9, the scoop may be mounted upon a post or the like 10 having connection with a weighing means housed within the hollow handle 5. Exteriorly of the handle, there is provided an indicator 12 adapted to move over an accurate dial 13 for the purpose of indicating the weight of any contents that may be held within the scoop 4.

The weighing means preferably is a unitary structure completely separable from the handle by merely removing the screws or other fastening devices 14, so that the weighing means is instantly interchangeable with others, in scoop scale structures of the character disclosed.

The weighing means or apparatus may comprise a stationary plate 15 and a relatively movable plate 16, arranged substantially parallel to one another in a vertical plane. The plates may be furnished with sets of perforate lugs 17 and 18 along opposite sides thereof, whereby the plates may be joined for relative movement in substantial parallelism, by means of link structures indicated at 19 and 20.

The link structure 20 comprises a pair of spaced parallel links connected together by means of a strut 21, said links having opposed apertured ends 22 and 23 perforated to receive the shafts 24 and 25 which extend through the apertures of the pairs of perforated lugs 17 and 18 near the lower end of the weighing apparatus; likewise, the link structure 19 at the upper end of the weighing apparatus, comprises a pair of links 26 and 27 maintained in spaced parallel relationship by means of the strut or connector 28. The ends of the links 26 and 27 are perforated so as to receive the shafts 29 and 30 which pass through the perforate lugs 17 and 18. By means of the link structures just described, plates 15 and 16 may be moved relatively in opposite directions, while maintaining a parallel relationship.

Near the upper end of the movable plate 16, means are provided for supporting the upright post 10. Said means may be in the form of an extension 31 overhanging the link structure 19 and to which extension the lower end of post 10 is rigidly fixed. The post may be furnished with any suitable means, such as a stop 32, for limiting upward movement of post 10 through the enlarged aperture 33 of the handle, when the scoop is empty. The nature of the stop 32 is immaterial to the invention. Downward movement of post 10 may be limited by contact of the coupling device 9 upon upper end of handle 5, and to this extent the coupling device 9 may be considered a stop or abutment.

The stationary plate 15 is provided with a suitable extension 34 arranged to support the upper end 35 of a spring 36, the opposite end 37 of which may be suitably anchored to the movable plate 16 or any part movable with said plate. As herein disclosed, the lower end of the spring 45 is joined with the movable plate through an adjusting means, whereby the spring tension may be varied in order to provide for compensation thereof with the indicator.

Although the adjusting means for the spring may assume one of many structural designs, there is illustrated by way of example an adjusting means which comprises a cross-piece 38 having opposed perforate ears 39 and 40, through which ears the shaft 24 of plate 16 may extend. At a point substantially centrally of the cross-piece, an aperture 41 may be provided as a bearing in which the screw 42 may be rotated, preferably by means of a finger piece or other actuating member 43. A spring seat member 44 threadedly engages the screw 42 and preferably is fixed to the lower end 37 of the spring, so that said seat member 44 may not rotate with the screw when the actuator 43 is turned to the various positions of adjustment. The seat member may be attached to the spring by bending the radial arms of said member about an adjacent coil of the spring, it being understood, however, that other forms of attachment may be resorted to if desired.

By means of the arrangement just described, the movable plate 16 is yieldingly maintained in an elevated position relative to the stationary plate 15. The spring, of course, is properly designed so that various degrees of tension thereof will be proportionate to the weight of the contents of the scoop or container 4.

The upper link structure 19, rather than the lower one 20, carries means for actuating the indicator 12 and moving it across the calibrated dial 13, which dial is fixed relative to the handle 5. Said means may be in the form of a gear segment 45 which is fixed by riveting, welding, or otherwise to one of the links such as 26. The gear segment 45 is adapted to mesh with a pinion 46 which is fixed on the shaft 47 of the indicator 12. As is evident, the shaft 47 extends through the handle to the interior thereof, where the pinion 46 is fixed thereon in position to be engaged by segment 45. Placing a weight in the scoop 4 obviously will result in lowering the post 10 and plate 16 in opposition to the force of the spring 36, thereby causing the gear segment 45 to rotate about its center, which is the shaft 39, thereby resulting in rotation of pinion 46 in a clock-wise direction for advancing the indicator 12 over the calibrated dial 13. The weight of the scoop contents is thereby rendered visible exteriorly of the scoop scale handle 5.

Attention is directed particularly to the fact that the post 10 moves in conformity with the scoop, and relatively to the handle, without having a sliding connection or bearing where the post enters the handle. The reason for eliminating all such sliding bearings is to avoid inaccuracies which would result if the handle were not disposed at exact perpendicular during the weighing operation. For this reason, the opening 33 at the upper end of the handle is made quite large in comparison with the diameter of post 10. To further preserve the accuracy of the weighing apparatus, the various shafts 24, 25, 29 and 30 are of small diameter or, are otherwise adapted to reduce to a minimum any friction at the link structures. By reason of the construction herein disclosed, the weighing apparatus will function accurately even though the scoop scale be placed upright upon a surface which is not exactly horizontal. As a matter of fact, any surface which, in the judgment of the user, is apparently horizontal or substantially so, is sufficiently close to being horizontal to ensure accuracy in the weighing function of the device. This is not true of any scoop scale wherein the post 10 might have a sliding connection with the handle, as a bearing.

Figure 2:
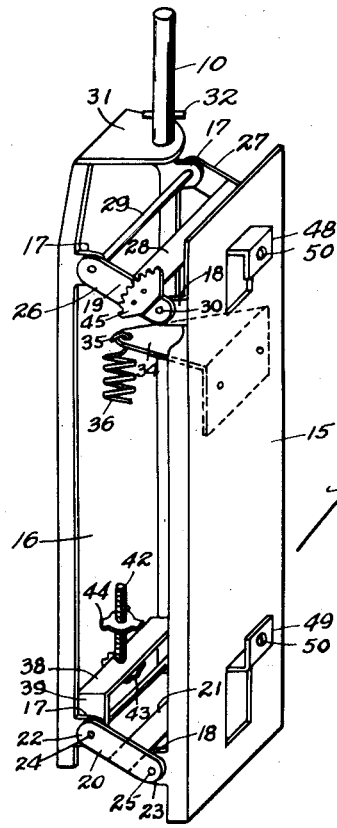
Fig. 2 is a perspective view, of the weighing apparatus contained in the scoop handle of Fig. 1.
Figure 3:
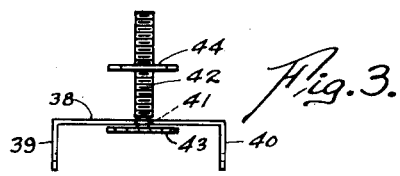
Fig. 3 is an elevational view of an adjusting means, which forms a detail of the invention.

A rather simple means of mounting the weighing mechanism within the scoop handle 5 is illustrated in Fig. 2, wherein 48 and 49 indicate angular lugs struck from the material of plate 15, and provided with threaded bores 50 for reception of the screws 14 of Fig. 1. By merely detaching the coupling means 9 from post 10 and removing the screws 14, the entire weighing mechanism is detachable as a unit, and may be removed from the handle 5 after detaching the base plate 6. The weighing mechanisms are thereby rendered interchangeable in different scoop structures, and may be easily replaced or serviced when necessary. It should be noted that removal and replacement of the weighing mechanism requires no disturbance of the indicator and its shaft and pinion wherefore those parts remain connected with the handle at all times, unless replacement thereof is deemed necessary or desirable.

The scoop may carry suitable lines, ribs or other indicia 51 whereby a user of the device may be apprised of the approximate amount of material contained within the scoop, prior to setting the device on end to perform the weighing function. Scoops 4 of varying shapes and sizes may be supplied as they are detachable from the post 10, although it is preferable that all such substitute scoops be of the same weight in order to avoid the need for adjusting the spring tension. It may here be stated that the particular configuration of the base plate 6 at the lower end of the handle, is immaterial to the invention so long as it furnishes a base of sufficient weight or stability to maintain the upright position of the scoop scale during the weighing operation. As will readily be evident the base plate may be in the form of a simple flat sheet, or of a bell shaped annular construction, if desired, and means other than that disclosed herein may be employed for detachably securing the base plate to the handle.

Various other modifications and changes in the structural details of the device may be made, within the scope of the appended claim, without departing from the spirit of the invention.

What is claimed is:

In a device of the class described, the combination of a scoop, a hollow elongated handle for the scoop having an apertured upper end, and a lower end, means at the lower end of the handle for supporting the handle in upright position upon a surface, a plate detachably fixed inside the handle in parallelism with the handle axis, a set of perforated lugs on the plate and arranged in upper and lower pairs at opposite sides of the plate, a movable plate within the handle, and including upper and lower pairs of perforate lugs corresponding with the lugs of the fixed plate, shafts extending loosely through the apertures of each pair of lugs of each plate, and spanning said plates, an upper link structure comprising a pair of parallel opposed links each having perforated ends for loose reception of an upper lug supported shaft of each plate, means rigidly connecting the opposed links to preclude relative movement thereof, a lower link structure of like character mounted upon the lower lug supported shaft of each plate, a spring yieldingly urging the movable plate always toward the upper apertured end of the handle, a post fixed to said movable plate and extending upwardly therefrom in the direction of plate movement, and through the handle aperture, said post being of such size as to pass through the handle aperture without contact against the aperture wall, means mounting the scoop upon the post in upright position thereon, and means actuated by the movement of the plate to indicate the weight of the scoop contents.

J. C. LEE THORNHILL.
FRED McCRACKEN.